United States Patent [19]

Ogawa et al.

[11] Patent Number: 5,630,561

[45] Date of Patent: May 20, 1997

[54] WEBBING RETRACTOR

[75] Inventors: Kiyoshi Ogawa; Satoshi Hirase, both of Kanagawa, Japan

[73] Assignee: NSK, Ltd., Japan

[21] Appl. No.: 551,415

[22] Filed: Nov. 1, 1995

[30] Foreign Application Priority Data

Nov. 10, 1994 [JP] Japan ...................... 6-300109

[51] Int. Cl.⁶ .......................... B60R 22/28; B60R 22/36
[52] U.S. Cl. ........................ 242/376; 242/379.1
[58] Field of Search ................... 242/376, 376.1, 242/379.1; 280/805, 806; 297/470–472, 478, 477, 476

[56] References Cited

U.S. PATENT DOCUMENTS

| | | | |
|---|---|---|---|
| 3,301,503 | 1/1967 | Browning | 247/376 |
| 3,369,767 | 2/1968 | Greenfield | 242/376 |
| 3,432,115 | 3/1969 | Stoffel et al. | 242/376 |
| 3,952,967 | 4/1976 | Barile et al. | |
| 4,254,921 | 3/1981 | Adomeit | 242/376 |
| 4,323,205 | 4/1982 | Tsuge et al. | |
| 4,385,736 | 5/1983 | Yamamoto | 242/376 |
| 4,623,104 | 11/1986 | Mori | 242/376 |
| 5,397,073 | 3/1995 | Fujimura | 242/376 |

FOREIGN PATENT DOCUMENTS

| | | |
|---|---|---|
| 57-21347 | 5/1982 | Japan. |
| 1-145760 | 10/1989 | Japan. |

Primary Examiner—John M. Jillions
Attorney, Agent, or Firm—Evenson, McKeown, Edwards & Lenahan P.L.L.C.

[57] ABSTRACT

A webbing retractor is provided with a lock mechanism. The webbing retractor further comprises a bobbin, a webbing-holding member and a webbing. The bobbin has a drum portion and a pair of flanges arranged on opposite ends of the drum. The flanges define grooves formed in a mutually-opposing relationship and angularly extending over a pre-determined length in a webbing-releasing direction as a first direction of rotation. The webbing-holding member extends between the grooves. The webbing is secured at one end thereof in the bobbin, wound back about the webbing-holding member at a first portion thereof apart from the one end thereof toward an opposite end thereof, and then wound in layers around the drum portion in the first direction of rotation at a second portion thereof closer to the opposite end than the first portion.

20 Claims, 8 Drawing Sheets

1

WEBBING RETRACTOR

BACKGROUND OF THE INVENTION a) Field of the Invention

This invention relates to a webbing retractor for use in a seat belt system of an automotive vehicle or the like, and more specifically to an improvement in a webbing retractor of the type that, when tensile force of at least a predetermined value is applied to a webbing due to an impact of a collision, the webbing is allowed to extend out to more effectively protect the body of an occupant.

b) Description of the Related Art

It has been the practice to use a webbing retractor, for example, in an automotive vehicle or the like to wind up a webbing which serves to restrain the body of an occupant in a seat in the event of an emergency such as a collision.

Such webbing retractors include those designed in such a way that, when a tensile force applied to the webbing by an impact is smaller than a predetermined value, the body of the occupant is restrained in the seat by simply preventing further release of the webbing but that, when tensile force applied to the webbing is greater than the predetermined value, the energy of the tensile force applied to the webbing is absorbed while allowing the webbing to extend out, whereby an abrupt deceleration or acceleration of the body of the occupant upon a collision is lessened to better protect the body of the occupant.

As a webbing retractor operating in this way, Japanese Patent Publication (Kokoku) No. SHO 57-21347, for example, discloses a webbing retractor of the type that, when a spindle and a bobbin undergo relative rotation, a flange is caused to move in a threaded fashion from a side of the spindle toward a side of the bobbin and an energy-absorbing member arranged there-between is hence caused to collapse to absorb energy.

Further, Japanese Utility Model Application Laid-Open (Kokai) No. HEI 1-145760 discloses a webbing retractor of the type that, when force of at least a predetermined value is applied, a spindle and a bobbin undergo relative rotation and a coil spring secured at one end thereof to the spindle and at an opposite end thereof to the bobbin is hence twisted to absorb energy.

To lessen an abrupt deceleration which acts upon the body of an occupant in the event of a collision, the greater the length of a webbing to be extended upon application of tensile force of at least a predetermined value to the webbing, the better. However, an unduly large extended length results in the potential danger that the body of the occupant may be allowed to move forward too much and may hit the steering wheel, the instrument panel and/or the like.

Further, to lessen the abrupt deceleration which acts upon the body of the occupant in the event of the collision, it is necessary not only to allow the webbing to simply extend out but also to sufficiently absorb the energy of tensile force applied to the webbing.

Because of the use of threaded members, the webbing retractor disclosed in Japanese Patent Publication (Kokoku) No. SHO 57-21347 referred to above is however accompanied by the drawback that to make the energy-absorbing member collapse for the absorption of sufficient energy, the bobbin has to be rotated a few times and the webbing is allowed to extend too much during that time.

On the other hand, the webbing retractor disclosed in Japanese Utility Model Application Laid-Open (Kokai) No. HEI 1-145760 referred to above is accompanied by the drawback that the extendible length of the webbing cannot be controlled because it is uncertain how long the relative rotation between the bobbin and the spindle would last.

SUMMARY OF THE INVENTION

With the foregoing in view, the present invention has as a primary object thereof the provision of a webbing retractor which, when allowing a webbing to extend upon application of tensile force of at least a predetermined value to the webbing, can precisely control the length of the webbing to be extended and can also sufficiently absorb the energy of the tensile force in the course of extension of the webbing.

In one aspect of the present invention, there is thus provided a webbing retractor provided with a lock mechanism, comprising: a bobbin having a drum portion and a pair of flanges arranged on opposite ends of said drum, said flanges defining grooves formed in a mutually-opposing relationship and angularly extending over a predetermined length in a webbing-releasing direction as a first direction of rotation; a webbing-holding member extending between said grooves; and a webbing secured at one end thereof in said bobbin, wound back about said webbing-holding member at a first portion thereof apart from said one end thereof toward an opposite end thereof, and then wound in layers around said drum portion in said first direction of rotation at a second portion thereof closer to said opposite end than said first portion.

When the body of an occupant is abruptly displaced forward as a result of a collision of an automobile vehicle, large tensile force is applied to the webbing by which the body of the occupant is restrained in a seat. As a consequence, the webbing which is wound around the bobbin is strongly tightened up around the bobbin and is hence caused to extend out. The webbing-holding member which holds the folded-back portion of the webbing is therefore pulled by the webbing and displaced in the direction of the circumference of the bobbin. The webbing-holding member is then displaced against frictional force acting on points of fitted engagements between opposite end portions of the webbing-holding member and the grooves formed in the associated flanges of the bobbin, against frictional force produced as a result of its displacement while separating adjacent layers of the webbing tightly wound on the bobbin from each other and widening a space between the adjacent layers, against frictional force produced between portions of the webbing, and the like, whereby the energy of the tensile force applied to the webbing is absorbed. The extension of the webbing stops when the opposite end portions of the webbing-holding member eventually abut at the limits of its movement such as at deepest portions of the grooves.

Owing to the displacement of the webbing-holding member against the above-mentioned frictional forces, the energy of the tensile force applied to the webbing can be sufficiently absorbed in the course of the extension of the webbing. Further, the extension of the webbing can be stopped by the abutment of the opposite end portions of the webbing-holding member at the limits of its displacement such as at the deepest portions of the grooves, so that the extendible length of the webbing can be precisely controlled.

The present invention can therefore provide a webbing retractor which can precisely control the extendible length of a webbing and can sufficiently absorb energy in the course of extension of the webbing.

DETAILED DESCRIPTION OF THE INVENTION AND PREFERRED EMBODIMENTS

With reference to the accompanying drawings, the webbing retractors according to the preferred embodiments of the present invention will hereinafter be described in detail.

The webbing retractor according to the first embodiment of the present invention will first be described with reference to FIG. 1 through FIG. 5.

Figure 1:
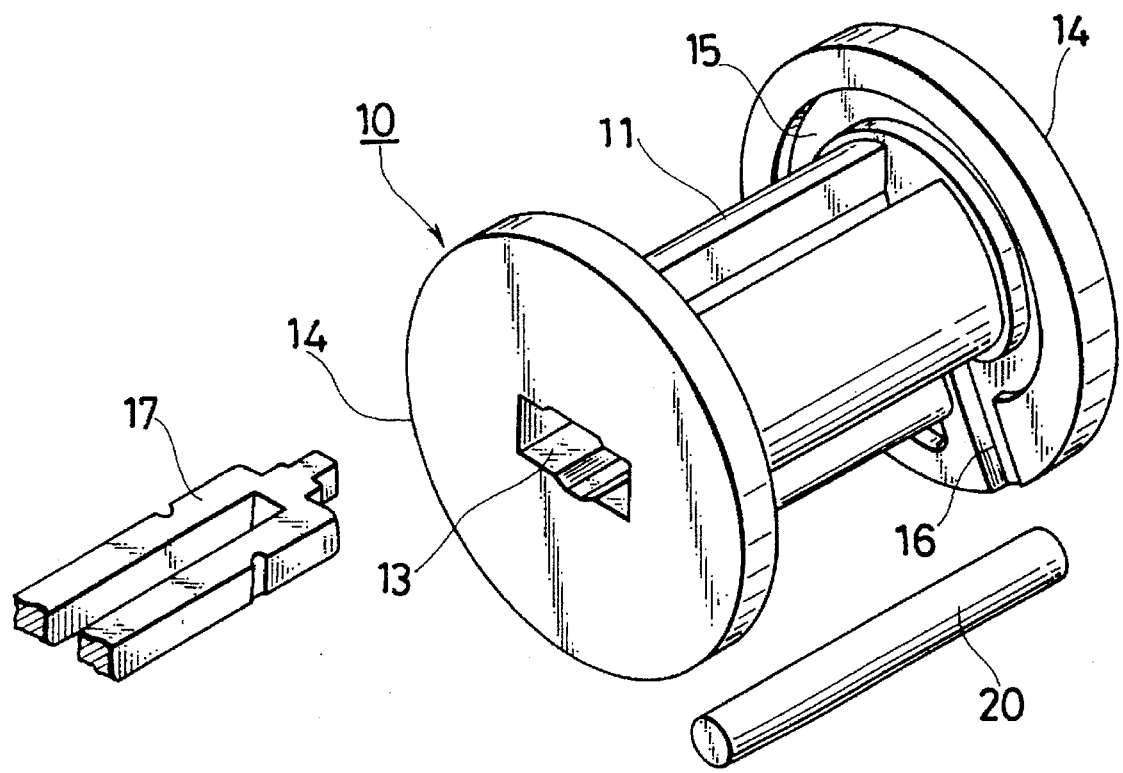
FIG. 1 is a perspective view of a bobbin and a rod-like member in a webbing retractor according to a a first embodiment of the present invention.

The webbing retractor of the first embodiment is provided, as illustrated in FIG. 1, with a winding spindle 17, a bobbin 10, and a pin 20 as a webbing-holding member.

Although omitted in FIG. 1, the winding spindle 17 is integrally provided at a left end thereof as viewed in the drawing with a ratchet wheel. In the event of a vehicular emergency, an unillustrated pawl is brought into engagement with the ratchet wheel by a known emergency locking mechanism so that the winding spindle 17 is locked to prevent any further rotation.

Figure 2:
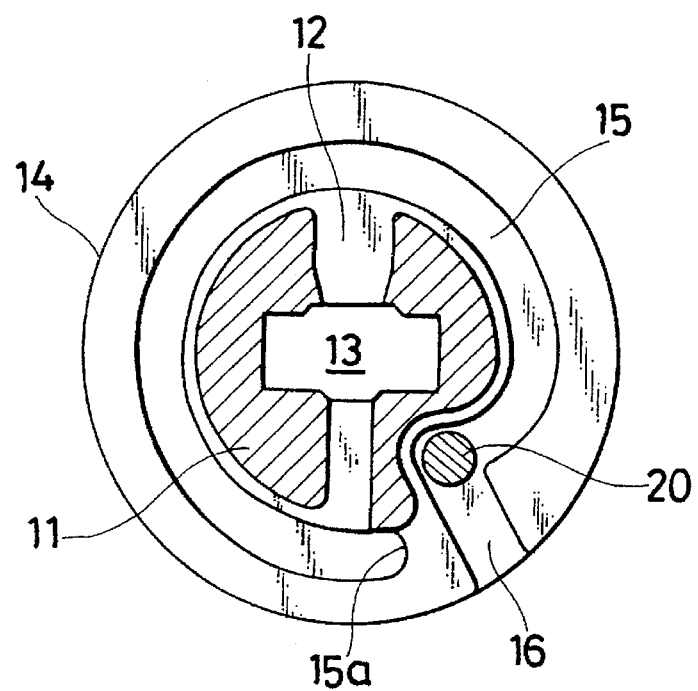
FIG. 2 is a transverse cross-sectional view of the bobbin shown in FIG. 1.
Figure 3:
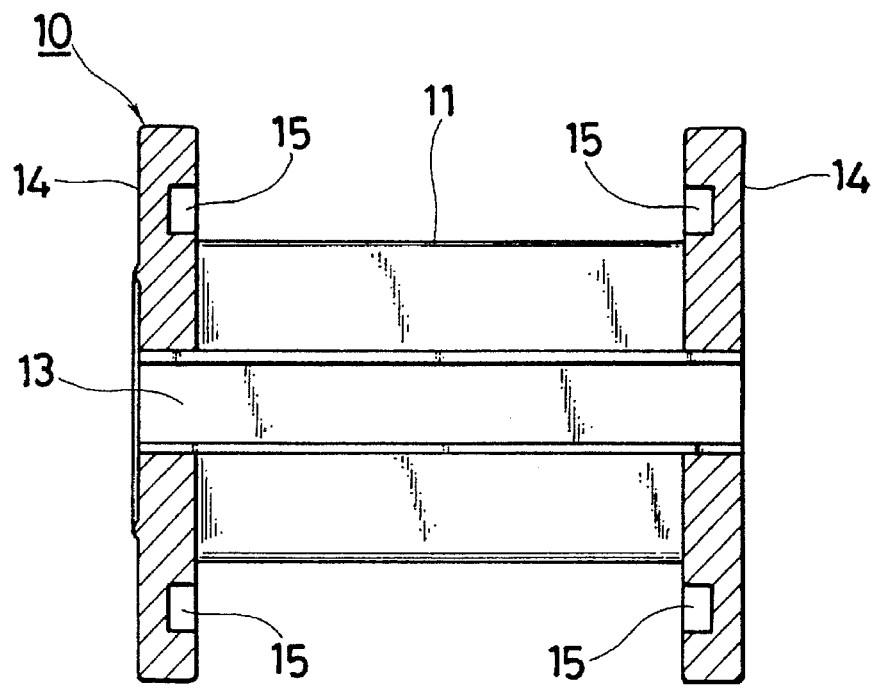
FIG. 3 is an axial cross-sectional view of the bobbin depicted in FIG. 1.

The bobbin 10 may be a molding obtained by injection molding a resin material, a die cast product of an aluminum alloy or a zinc alloy, or the like, and has a substantially cylindrical drum portion 11 and flanges 14 arranged upright on opposite ends of the drum portion 11. As shown in FIG. 2, the drum portion 11 is provided with a slit 12 in which an end portion of a webbing is inserted and also with a spindle-receiving hole 13 in which the winding spindle 17 is inserted. The flanges 14 are provided, as shown in FIGS. 2 and 3, with grooves 15 formed in a mutually-opposing relationship so that the grooves 15 extend over a predetermined length in an angular direction.

The pin 20 is a cylindrical rod made of a metal or a resin material and having a diameter slightly greater than the width of the grooves 15. In a state assembled with the bobbin 10, opposite end portions of the pin 20 have been positioned at entrance portions (leading ends) of the grooves 15 through inlet channels 16 formed in the flanges 14, respectively.

The distance of a central axis of a leading end portion of each groove 15 from a central axis of rotation of the bobbin 10 is shorter than the distance of a central axis of a remaining portion of the groove 15 from the central axis of rotation of the bobbin 10.

Figure 4:
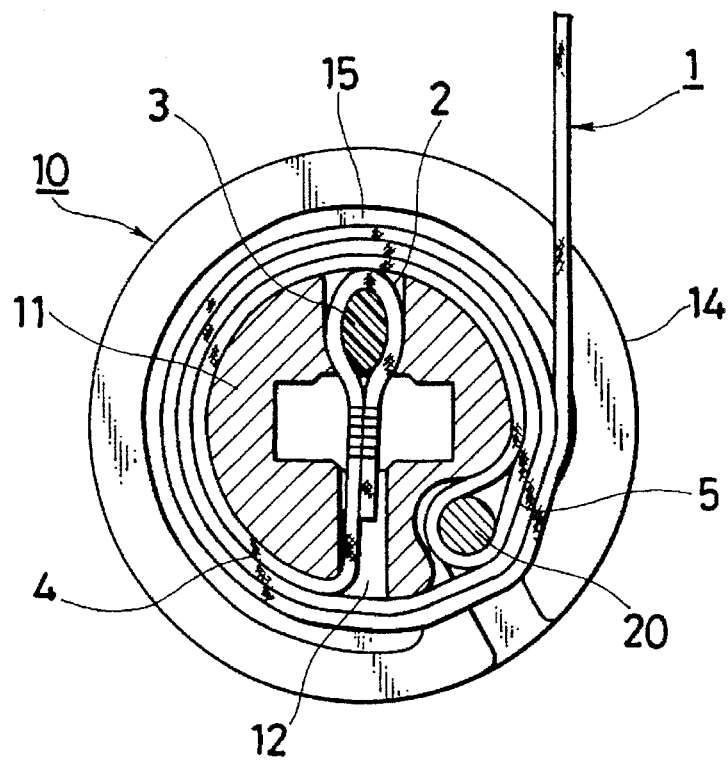
FIG. 4 is a transverse cross-sectional view showing the manner of winding of a webbing around the bobbin illustrated in FIG. 1.

A description will next be made of the manner of winding of a webbing 1 wound around the bobbin 10 and pin 20 constructed as described above. As is illustrated in FIG. 4, an end portion 2 of the webbing 1 is prevented from slipping out by a slip-out preventing pin 3 with the end portion 2 of the webbing 1 being inserted in the slit 12. After the webbing 1 has been wound clockwise approximately once around the drum portion 11 of the bobbin 10, the webbing 1 is folded back about the pin 20 so that the webbing 1 is reversed over 180 degrees. The webbing 1 is then wound counterclockwise a few times around the drum portion 11 of the bobbin 10. At this time, the pin 20 is pulled counterclockwise by the webbing 1. The width of each groove 15 is set slightly narrower than the diameter of the pin 20 so that, insofar as the webbing retractor is used in a usual manner, the pin 20 does not enter the grooves 15.

Figure 5A:
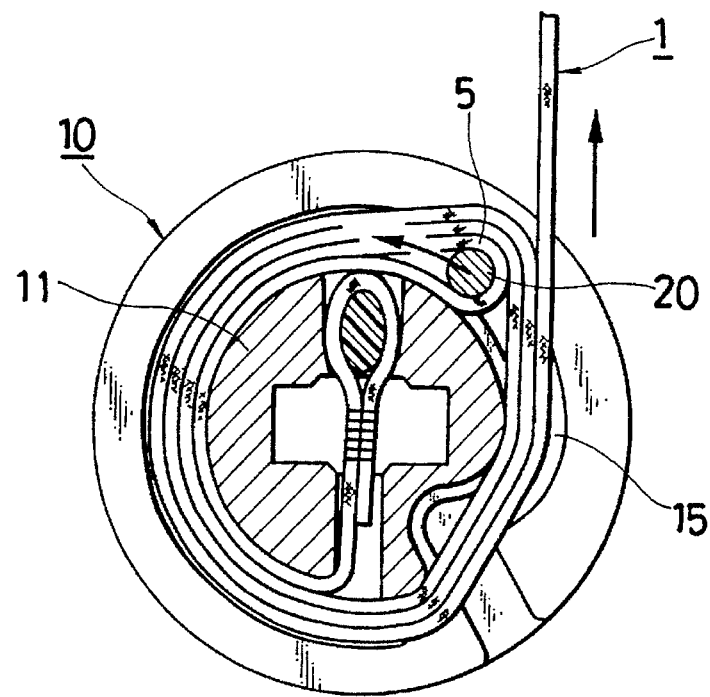
FIGS. 5A and 5B are transverse cross-sectional views illustrating operation of the webbing retractor of FIG. 1 when a tensile force is applied to the webbing.

Operation of the webbing retractor according to the first embodiment constructed as described above will next be described with reference to FIGS. 5A and 5B.

When the body of an occupant is abruptly displaced forward by an impact of a collision due to a traffic accident or the like, a large tensile force is applied to the webbing 1 so that the webbing 1 is begun to be pulled out of the webbing retractor. The emergency locking mechanism (not shown) arranged in the webbing retractor is actuated at this time, thereby locking rotation of the bobbin 10 in a webbing-releasing direction. As a result, the webbing 1 wound around the bobbin 10 is strongly wound up tight and extends out, whereby a strong tensile force is applied to the pin 20. When the magnitude of a tensile force acting on the webbing 1 exceeds a predetermined value, the pin 20 is pulled into the grooves 15 and, as indicated by an arrow in FIG. 5A, is displaced counterclockwise as viewed in the drawing in a state guided by the grooves 15.

As the widths of the grooves 15 are formed slightly narrower than the diameter of the pin 20, the opposite end portions of the pin 20 are displaced in the grooves 15 of the bobbin 10 while widening the grooves 15. The pin 20 is therefore displaced in the grooves 15 against deformation resistances of the grooves 15 in addition to its frictional force with the grooves 15, whereby the energy of a tensile force acting on the webbing 1 is absorbed. Further, since the pin 20 is displaced while separating adjacent layers of the webbing tightly wound on the drum portion 11 of the bobbin 10 from each other and widening a space between the adjacent layers, the energy is also absorbed by this displacement. Moreover, the webbing 1 is allowed to extend out twice as much as the distance of a displacement of the pin 20. Frictional force produced by mutual rubbing of portions of the webbing 1 are large. The energy is also absorbed by this frictional force.

Figure 5B:
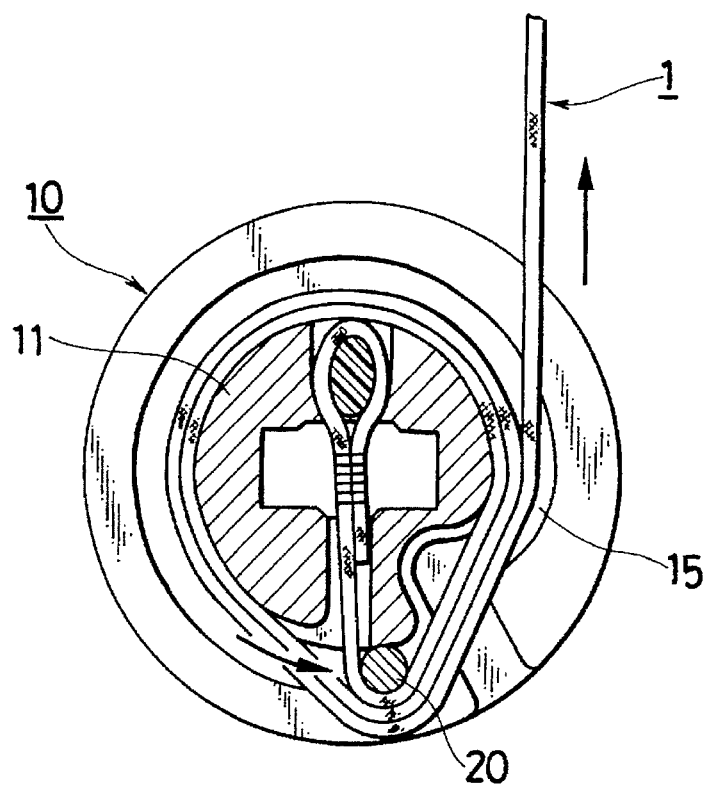

As is depicted in FIG. 5B, the extension of the webbing 1 can be stopped when the pin 20 continuously underwent a displacement in the counterclockwise direction as viewed in the drawing and has abutted at deepest portions 15a (see FIG. 2) of the grooves 15.

According to the webbing retractor of the first embodiment, upon application of tensile force of at least a predetermined value to the webbing 1 in the event of an emergency such as a collision, the webbing 1 is allowed to extend out over a predetermined length while the pin 20 is displaced in the grooves 15 to absorb the energy of the tensile force acting on the webbing 1. It is therefore possible to lessen an abrupt deceleration acting on the body of an occupant in the event of a collision, so that the body of the occupant can be protected more surely.

Further, abutment of the pin 20 at the deepest portions of the grooves 15 makes it possible to surely limit the extendible length of the webbing within a predetermined range.

Moreover, the webbing retractor according to the first embodiment has been obtained by adding only the cylindrical pin to a conventional webbing retractor. It is therefore possible to minimize an increase in the number of parts and also an increase in the manufacturing cost.

Next, the webbing retractor according to the second embodiment of the present invention will be described with reference to FIGS. 6 and 7.

Figure 6:
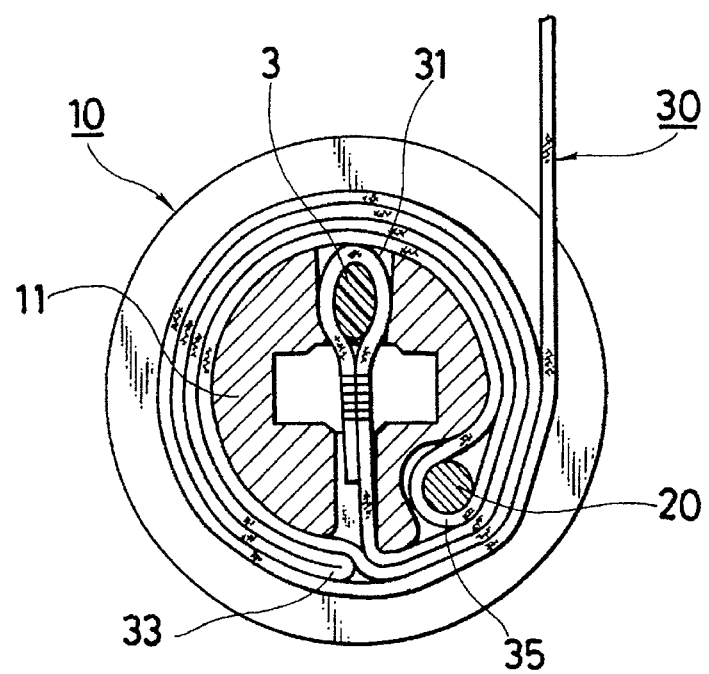
FIG. 6 is a transverse cross-sectional view depicting the manner of winding of a webbing around a bobbin in a webbing retractor according to a second embodiment of the present invention.
Figure 7:
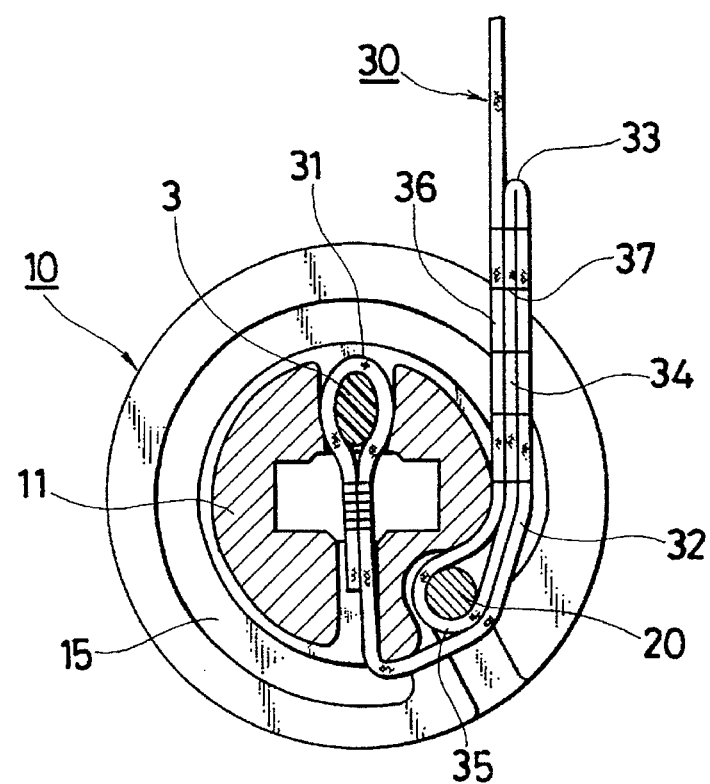
FIG. 7 is a transverse cross-sectional view similar to FIG. 6 but illustrates the webbing before winding it around the bobbin.

As is illustrated in FIG. 6, in the webbing retractor according to the second embodiment of the present invention, the manner of winding of a webbing 30 around a bobbin 10 is basically different from the manner of winding of the webbing 10 around the bobbin 10. Namely, as is depicted in FIG. 7, the webbing 30 in this second embodiment has been obtained by folding back the webbing in the form of letter Z, superposing portions 32, 34, 36 in close contact with each other and then sewing these superposed portions. Further, a pin 20 has been assembled beforehand in a folded-back portion 35. It is therefore possible to achieve such a wound state as shown in FIG. 6 by simply winding the webbing 30 counterclockwise a few times around the drum portion 11 of the bobbin 10 after securing an end portion 31 of the webbing 30 in the drum portion 11 of the bobbin 10 by means of the slip-off preventing pin 3.

In the webbing retractor according to the second embodiment, the pin 20 has been assembled beforehand in the webbing 30 and moreover, it is only required to wind the webbing 30 in the fixed direction around the bobbin 10. It is therefore unnecessary to reverse the winding direction in the course of the winding work. Further, the folded-back portions 32, 34, 36 have been sewn together so that the folded-back lengths are fixed. It is accordingly unnecessary to adjust the lengths of the folded-back portions upon assembly. The assembly work of the webbing 30 on the bobbin 10 can hence be performed efficiently.

Incidentally, the sewing of the folded-back portions of the webbing 30 may be in the form of provisional stitches for facilitating the assembly of the webbing on the bobbin by sub-assembling the pin 20 and also fixing the folded-back portions. As an alternative, the webbing may be formed, depending on the manner of sewing, into a so-called "fuse webbing" which absorbs energy by tear-off of sewing threads.

In the webbing retractor according to the first embodiment, the folded-back length of the webbing 1 is determined by the dimensions and shape of the bobbin 10. In the webbing retractor according to the second embodiment, however, the extendible length of the webbing in the event of a collision can be set for each vehicle by adjusting the lengths of the folded-back portions 32, 34, 36 of the webbing 30. Including the fuse-webbing-like effect of the folded-back portions, the webbing retractor according to the second embodiment has the excellent advantage that the energy absorption characteristic can be modified despite the use of the same bobbin 10.

Needless to say, the energy absorption characteristic can also be modified depending on the sewing threads and the manner of sewing.

The webbing retractor according to the third embodiment of the present invention will next be described with reference to FIG. 8.

Figure 8:
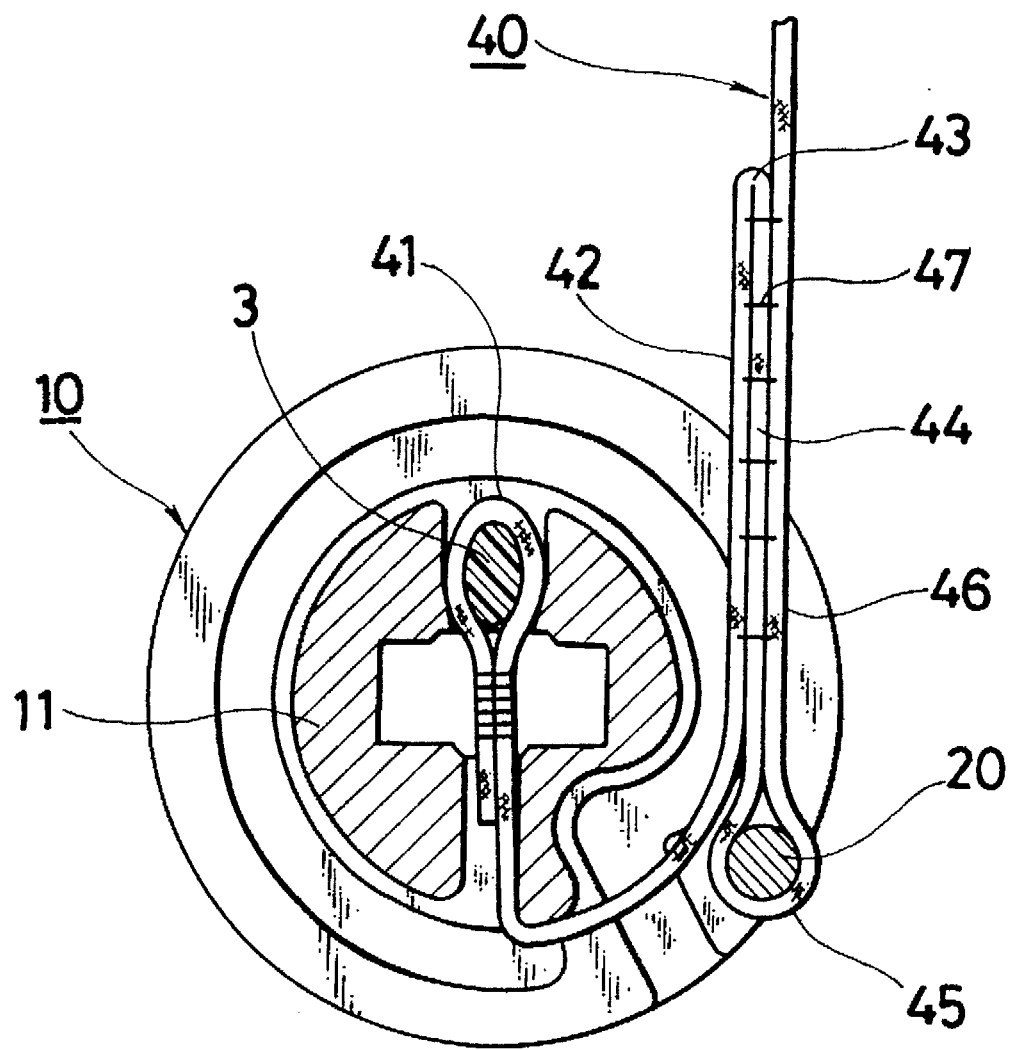
FIG. 8 is a transverse cross-sectional view of a webbing retractor according to a third embodiment of the present invention.

In the third embodiment, the construction of folded-back portions of a webbing 40 is different from that of the folded-back portions of the webbing 30 in the second embodiment as is shown in FIG. 8. Described specifically, among portions 42, 44, 46 superposed together in the folded-back portions, the portion 42 which is closest to an end portion 41 of the webbing 40 is disposed in contact with an outer peripheral surface of the drum portion 11 of the bobbin 10. Owing to this, the pin 20 is held in place in a radial direction by the webbing 40 wound around the bobbin 10 when the webbing 40 has been wound around the bobbin 10. The pin 20 is therefore strongly affected by tightening of the wound portion of the webbing 40, said tightening taking place upon application of a strong tensile force to the webbing 40, so that upon displacement of the pin 20, a large frictional force acts on the pin 20 to make it possible to absorb greater energy.

The webbing retractor according to the fourth embodiment of the present invention will next be described with reference to FIGS. 9 and 10.

Figure 9:
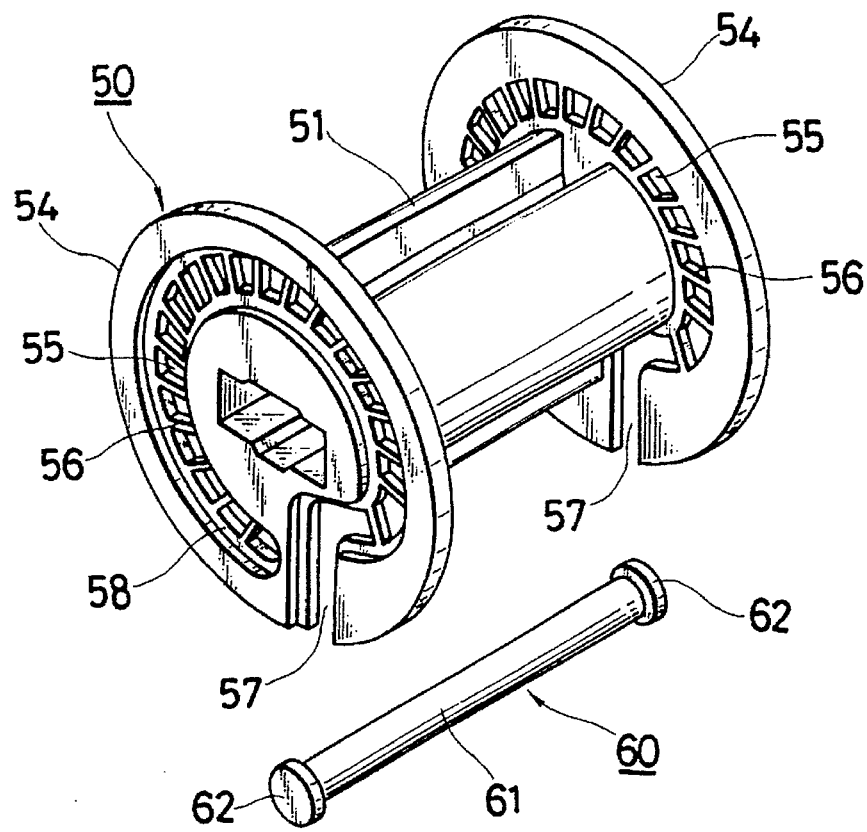
FIG. 9 is a perspective view of a bobbin and a rod-like member in a webbing retractor according to a fourth embodiment of the present invention.
Figure 10:
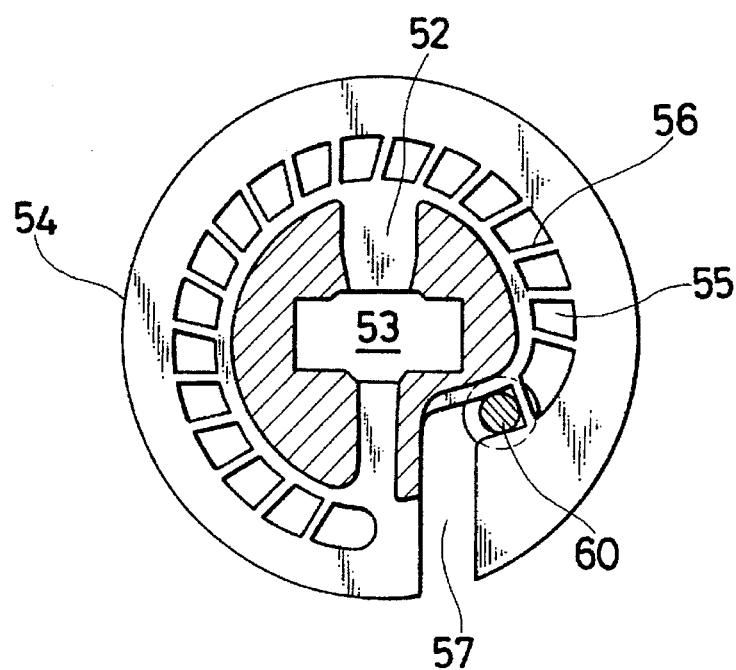
FIG. 10 is a transverse cross-sectional view of the bobbin shown in FIG. 9.

In a bobbin 50 in the fourth embodiment, a groove 55 formed in each flange 54 extends through the flange in the direction of its thickness as is illustrated in FIG. 9. Further, the groove 55 is provided with plural ribs 56 extending substantially in radial directions and arranged at intervals in an angular direction. In this fourth embodiment, a pin 60 as a webbing-holding member is of the shape that a cylindrical rod portion 61 provided at opposite end portions thereof with flanges 62, respectively. In addition, a webbing 1 is wound around the bobbin 50 as is depicted in FIG. 4.

In the webbing retractor of the fourth embodiment constructed as described above, energy is absorbed because the pin 60 is displaced while breaking the ribs 56 when the pin 60 is displaced in the grooves 55. The pin 60 does not fall off from the flanges 54 of the bobbin 50 at this time since the flanges 62 arranged on the opposite end portions of the pin 60 are in engagement with stepped portions 58 formed on outer side walls of the associated flanges 54 along the corresponding grooves 55.

As the groove 55 in each flange 54 of the bobbin 50 is formed extending through the flange 54 in the direction of its thickness, an injection molding die or die-casting die of a simpler split structure can be used upon molding the bobbin 50. The production cost for a mold can therefore be reduced.

Although the ribs 56 are arranged in the fourth embodiment, their shape can obviously be determined as desired as long as the rib shape permits absorption of energy through breakage by the pin 60.

Needless to say, each groove 15 of the bobbin 10 in the above-described first embodiment may be internally provided with deformable means which can be either broken or deformed by the pin 20 to absorb energy.

With reference to FIGS. 11 through 14, the webbing retractor according to the fifth embodiment of the present invention will be described next.

Figure 11:
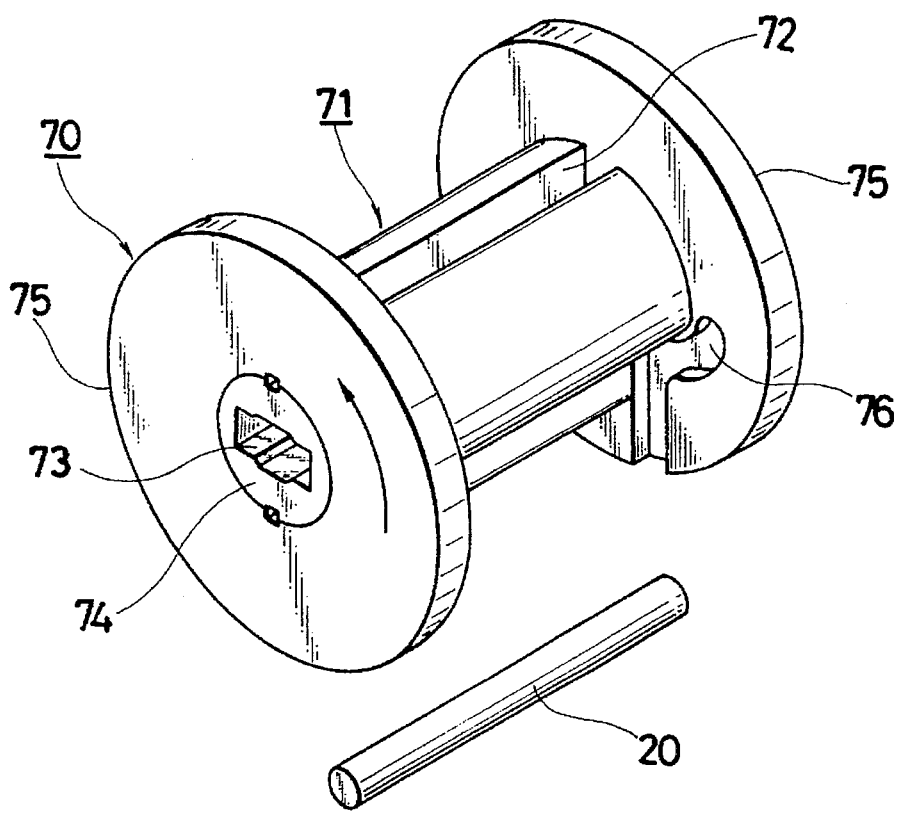
FIG. 11 is a perspective view of a bobbin and a rod-like member in a webbing retractor according to a fifth embodiment of the present invention.

As is illustrated in FIG. 11, a bobbin 70 in the webbing retractor of the fifth embodiment is provided with a drum portion 71 around which a webbing is wound, and also with a pair of annular flanges 75 fitted on opposite end portions of the drum portion 71 so that the flanges 75 can rotate about an axis of the drum portion 71 relative to the drum portion 71.

Grooves 76 are formed in a mutually-opposing relationship in inner side walls of the paired flanges 75, respectively. Each groove 76 has an angular length is much shorter than the length of each groove 15 formed in the bobbin 10 in the above-described first embodiment, and the width of each groove 76 is slightly greater than the diameter of the pin 20.

Figure 12:
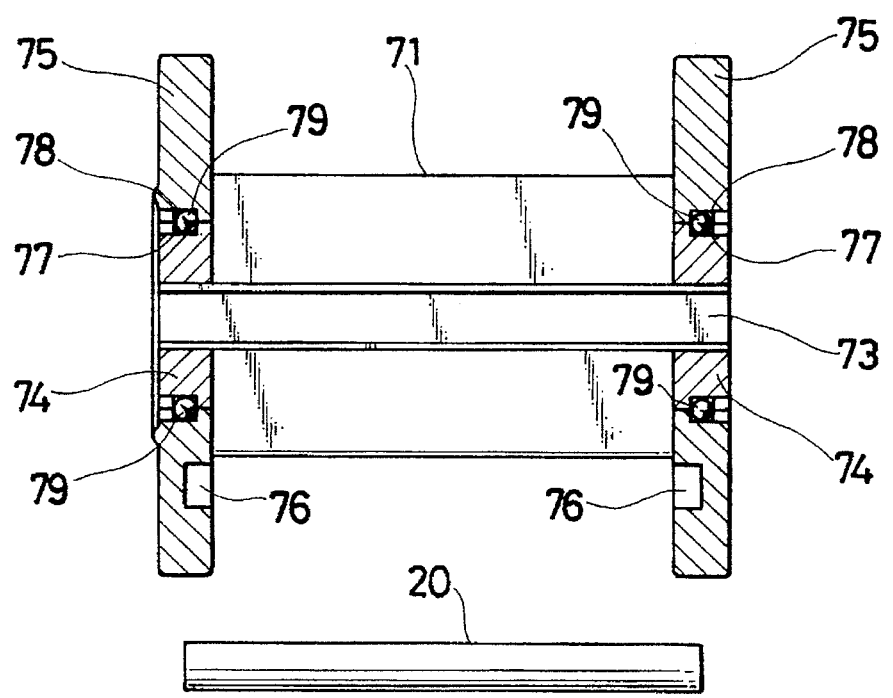
FIG. 12 is an axial cross-sectional view of the bobbin shown in FIG. 11, in which the rod-like member shown in FIG. 11 is also illustrated in front elevation.

As is depicted in FIG. 12, recesses 77, 78 are formed in a mutually-opposing relationship in a fitted wall of each end portion of the drum portion 71 and a fitting wall of its corresponding flange 75, respectively. These recesses 77, 78 extend in the direction of the axis of the drum portion 71. A steel ball 79 is tightly fitted within each combination of the recesses 77, 78.

Although not seen in FIG. 12, at least one of the fitted and fitting walls is provided with a guide groove for the steel ball 79. The guide groove is formed in an angular direction and has, for example, a V-shape in cross-section.

Around the bobbin 70, a webbing 1 is wound in the same manner as in the above-described first embodiment. The webbing 1 can however be wound in the same manner as in the second embodiment or the third embodiment.

Figure 13:
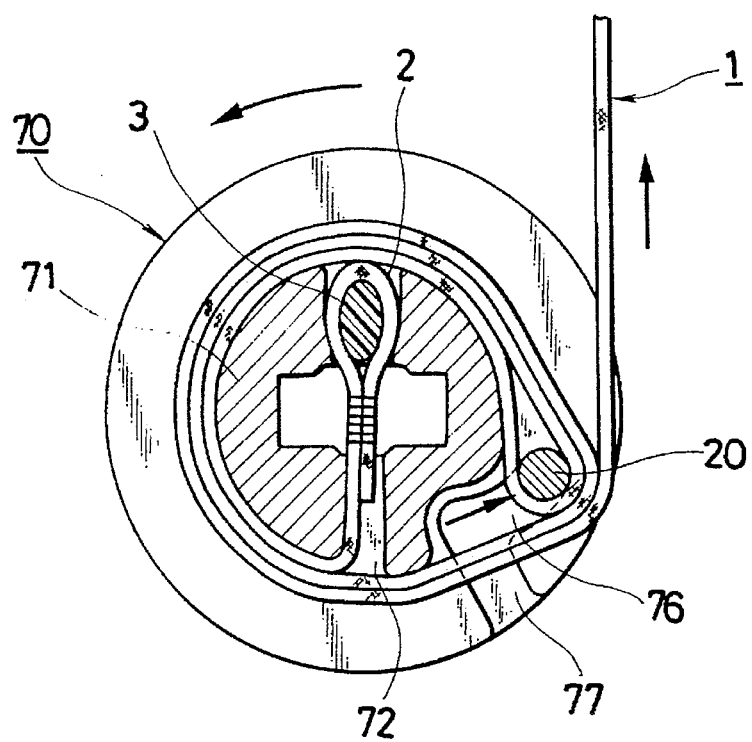
FIG. 13 is a cross-sectional view showing the manner of a webbing wound around the bobbin in the webbing retractor according to the fifth embodiment of the present invention.

Operation of the webbing retractor of the fifth embodiment will next be described with reference to FIGS. 13 and 14.

Normally, the flanges 75 do not rotate relative to the drum portion 71. When tensile force of at least a predetermined value is applied to the webbing 1, however, the pin 20 is displaced toward deeper sides of the grooves 76 and is soon brought into abutment at deepest portions of the grooves 76. On the other hand, the tensile force applied to the webbing 1 acts on the flanges 75 via the pin 20. The drum portion 71 of the bobbin 70 is however locked by an unillustrated emergency locking mechanism so that the drum portion 71 cannot rotate. Therefore, the flanges 75 are pulled by the pin 20 and rotate relative to the drum portion 71. The webbing 1 is therefore allowed to extend out.

At this time, the flanges 75 rotate relative to the drum portion 71 against resistance produced upon plastic deformation of the guide grooves, which are each formed in at least one of the fitted wall of each end portion of the drum portion 71 and the fitting wall of the corresponding flange 75, by the steel balls 79 and also against resistance produced upon plastic deformation of the steel balls 79 themselves. The energy of the tensile force applied to the webbing 1 can therefore be absorbed.

Figure 14:
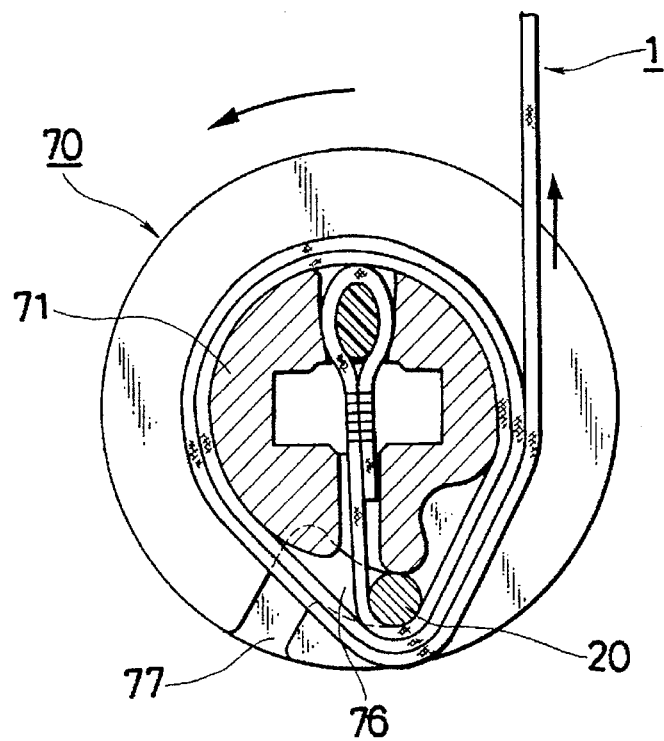
FIG. 14 is a transverse cross-sectional view illustrating operation of the webbing retractor when a tensile force is applied to the webbing in the fifth embodiment.

When the flanges 75 rotate counterclockwise as viewed in the drawing and the portions of the webbing 1 wound back about the pin 20 have been caused to fully extend out as is depicted in FIG. 14, the webbing 1 is wound around the drum portion 71 so that the tensile force applied to the webbing 1 no longer acts on the pin 20. The rotation of the flanges 75 relative the drum portion 71 therefore stops.

In other words, the webbing 1 is allowed to extend over a predetermined length in the webbing retractor according to the fifth embodiment while absorbing the energy of the tensile force applied to the webbing 1 by the rotation of the flanges 75 relative to the drum portion 71. Accordingly, an abrupt deceleration which acts on the body of an occupant in the event of a collision is lessened, thereby making it possible to more surely protect the body of the occupant.

Further, if the winding manner of the webbing in the second embodiment or the third embodiment is followed, the extendible length of the webbing 1 can be adjusted by adjusting the lengths of the folded-back and sewn portions of the webbing 1.

In this embodiment, the diameter of the pin 20 can also be made slightly greater than the width of the grooves 76 so that energy can be absorbed in the course of displacement of the pin 20.

Needless to say, the webbing retractor according to the present invention is not limited to the above-described embodiments but can be modified in various ways on the basis of the gist of the present invention.

For example, although each of the above described embodiments has the two-parts structure that the bobbin is mounted on the winding spindle whose rotation is locked at an emergency, they can be integrated. Further, although the webbing-holding member in each of the above-described embodiments is the cylindrical member, the webbing-holding member can be formed, for example, to have a polygonal cross-section or a hollow cross-section or to be formed into a plate-like shape insofar as its opposite end portions are maintained in engagement with the grooves formed in the corresponding flanges while holding the webbing.

It is also to be noted that the webbing retractor according to the present invention is not limited to the type that rotation of the winding spindle is locked by an emergency locking mechanism. The webbing retractor according to the present invention can be of the type that it is equipped with both an emergency locking mechanism and an automatic locking mechanism (for example, an automatic locking mechanism which is automatically actuated when the webbing is wound back after it has been fully wound out) and is locked by the automatic locking mechanism.

What is claimed is:

1. A webbing retractor provided with a lock mechanism, comprising;

a bobbin having a drum portion and a pair of flanges arranged on opposite ends of said drum, said flanges defining grooves formed in a mutually-opposing relationship and angularly extending over a groove length in a webbing-releasing direction as a first direction of rotation, each said groove having a deepest portion at an end of said groove length;

a webbing-holding member extending between said grooves and arranged at a distance from said deepest portions of said grooves; and a webbing secured at one end thereof in said bobbin, wound back about said webbing-holding member at a first portion thereof apart from said one end thereof toward an opposite end thereof, and then wound in layers around said drum portion in said first direction of rotation at a second portion thereof closer to said opposite end than said first portion.

2. A webbing retractor according to claim 1, wherein said webbing-holding member is a cylindrical pin whose diameter is slightly greater than a width of the grooves formed in said paired flanges.

3. A webbing retractor according to claim 1, wherein each said groove length extends substantially encircling the corresponding end of said drum portion.

4. A webbing retractor according to claim 1, wherein said webbing-holding member is displaceable along said groove length.

5. A webbing retractor according to claim 4, wherein said webbing-holding member abuts said deepest portions of said groove lengths when said webbing-holding member is fully displaced along said groove length.

6. A webbing retractor provided with a lock mechanism, comprising;
   a bobbin having a drum portion and a pair of flanges arranged on opposite ends of said drum, said flanges defining grooves formed in a mutually-opposing relationship and angularly extending over a groove length in a webbing-releasing direction as a first direction of rotation;
   a webbing-holding member extending between said grooves; and
   a webbing secured at one end thereof in said bobbin, wound back about said webbing-holding member at a first portion thereof apart from said one end thereof toward an opposite end thereof, and then wound in layers around said drum portion in said first direction of rotation at a second portion thereof closer to said opposite end than said first portion, wherein said webbing is first wound on said drum portion of said bobbin in a webbing-winding direction as a second direction of rotation, said webbing-winding direction being opposite to said first direction of rotation, wound back about said webbing-holding member and then wound in layers on said drum portion.

7. A webbing retractor according to claim 6, wherein said webbing-holding member is displaceable along said groove length.

8. A webbing retractor provided with a lock mechanism, comprising;
   a bobbin having a drum portion and a pair of flanges arranged on opposite ends of said drum, said flanges defining grooves formed in a mutually-opposing relationship and angularly extending over a groove length in a webbing-releasing direction as a first direction of rotation;
   a webbing-holding member extending between said grooves; and
   a webbing secured at one end thereof in said bobbin, wound back about said webbing-holding member at a first portion thereof apart from said one end thereof toward an opposite end thereof, and then wound in layers around said drum portion in said first direction of rotation at a second portion thereof closer to said opposite end than said first portion, wherein each of said paired flanges is additionally provided with an inlet channel extending between a leading end of said groove and an outer periphery of said flange, and said inlet channel has a width great enough to permit introduction of a corresponding end portion of said webbing-holding member into the groove.

9. A webbing retractor provided with a lock mechanism, comprising;
   a bobbin having a drum portion and a pair of flanges arranged on opposite ends of said drum, said flanges defining grooves formed in a mutually-opposing relationship and angularly extending over a groove length in a webbing-releasing direction as a first direction of rotation;
   a webbing-holding member extending between said grooves; and
   a webbing secured at one end thereof in said bobbin, wound back about said webbing-holding member at a first portion thereof apart from said one end thereof toward an opposite end thereof, and then wound in layers around said drum portion in said first direction of rotation at a second portion thereof closer to said opposite end than said first portion, wherein the distance of a central axis of a leading end portion of each groove from a central axis of rotation of said bobbin is shorter than the distance of a central axis of a remaining portion of said groove from said central axis of rotation of said bobbin.

10. A webbing retractor provided with a lock mechanism, comprising;
    a bobbin having a drum portion and a pair of flanges arranged on opposite ends of said drum, said flanges defining grooves formed in a mutually-opposing relationship and angularly extending over a qroove length in a webbing-releasing direction as a first direction of rotation;
    a webbing-holding member extending between said grooves; and
    a webbing secured at one end thereof in said bobbin, wound back about said webbing-holding member at a first portion thereof apart from said one end thereof toward an opposite end thereof, and then wound in layers around said drum portion in said first direction of rotation at a second portion thereof closer to said opposite end than said first portion, wherein said webbing extends about said drum portion in said first direction of rotation over a predetermined length beyond the position of said webbing-holding means, is folded back toward a side of a central axis of said bobbin, is wound back inwardly about said webbing-holding member, and is wound in layers around said drum portion in said first direction of rotation.

11. A webbing retractor according to claim 10, wherein three layers of portions of said webbing, said portions consisting of a webbing portion extending over said predetermined length, another webbing portion folded back and extending to said webbing-holding member and a further webbing portion folded back from said webbing-holding member, are provisionally held together to maintain their relative positional relationship in the direction of the length of said webbing.

12. A webbing retractor according to claim 11, wherein said three layers of webbing portions are sewn together with sewing threads so that energy can be absorbed by tear-off of said sewing threads.

13. A webbing retractor provided with a lock mechanism, comprising;
    a bobbin having a drum portion and a pair of flanges arranged on opposite ends of said drum, said flanges defining grooves formed in a mutually-opposing relationship and angularly extending over a qroove length in a webbing-releasing direction as a first direction of rotation;
    a webbing-holding member extending between said grooves; and
    a webbing secured at one end thereof in said bobbin, wound back about said webbing-holding member at a first portion thereof apart from said one end thereof toward an opposite end thereof, and then wound in layers around said drum portion in said first direction of rotation at a second portion thereof closer to said opposite end than said first portion, wherein said webbing extends about said drum portion in said first direction of rotation over a predetermined length beyond the position of said webbing-holding means, is folded back to a side opposite to a central axis of said bobbin, is wound back outwardly about said webbing-holding member, and is then wound in layers around said drum portion in said first direction of rotation.

14. A webbing retractor according to claim 13, wherein three layers of portions of said webbing, said portions consisting of a webbing portion extending over said predetermined length, another webbing portion folded back and extending to said webbing-holding member and a further webbing portion folded back from said webbing-holding member, are provisionally held together to maintain their relative positional relationship in the direction of the length of said webbing.

15. A webbing retractor according to claim 14, wherein said three layers of webbing portions are sewn together with sewing threads so that energy can be absorbed by tear-off of said sewing threads.

16. A webbing retractor provided with a lock mechanism, comprising;

a bobbin having a drum portion and a pair of flanges arranged on opposite ends of said drum, said flanges defininq grooves formed in a mutually-opposing relationship and angularly extending over a groove length in a webbing-releasing direction as a first direction of rotation;

a webbing-holding member extending between said grooves; and a webbing secured at one end thereof in said bobbin, wound back about said webbing-holding member at a first portion thereof apart from said one end thereof toward an opposite end thereof, and then wound in layers around said drum portion in said first direction of rotation at a second portion thereof closer to said opposite end than said first portion, wherein each groove extends through the corresponding flange in the direction of the thickness of said flange and is provided with plural ribs extending substantially in radial directions and arranged at intervals in an angular direction.

17. A webbing retractor according to claim 16, wherein said webbing-holding member is provided at opposite ends thereof with flanges.

18. A webbing retractor provided with a lock mechanism, comprising;

a bobbin having a drum portion and a pair of flanges arranged on opposite ends of said drum, said flanges defining grooves formed in a mutually-opposing relationship and angularly extending over a qroove length in a webbing-releasing direction as a first direction of rotation;

a webbing-holding member extending between said grooves; and a webbing secured at one end thereof in said bobbin, wound back about said webbing-holding member at a first portion thereof apart from said one end thereof toward an opposite end thereof, and then wound in layers around said drum portion in said first direction of rotation at a second portion thereof closer to said opposite end than said first portion, wherein said drum portion and said paired flanges are connected rotatably relative to each other via energy-absorbing mechanisms, respectively.

19. A webbing retractor according to claim 18, wherein each of said energy-absorbing mechanisms comprises recesses formed in a mutually-opposing relationship in a fitted wall of a corresponding end portion of said drum portion and a fitting wall of the corresponding flange, respectively, and extending in the direction of an axis of said drum portion, and a steel ball disposed within said recesses.

20. A webbing retractor according to claim 18, wherein said webbing-holding member is a cylindrical pin and each groove has a width greater than the diameter of said pin.

* * * * *